United States Patent [19]

Angelbeck et al.

[11] Patent Number: 4,597,678
[45] Date of Patent: Jul. 1, 1986

[54] BEARING DEVICE FOR THREADED SPINDLES

[75] Inventors: Rolf Angelbeck, Kiel; Reinhard Gesell, Schoenkirchen; Matthias Goessner, Malente, all of Fed. Rep. of Germany

[73] Assignee: Dr. Ing. Rudolf Hell GmbH, Fed. Rep. of Germany

[21] Appl. No.: 793,553

[22] Filed: Oct. 31, 1985

[30] Foreign Application Priority Data

Dec. 22, 1984 [DE] Fed. Rep. of Germany ....... 3447162

[51] Int. Cl.⁴ ............................................. F16C 19/12
[52] U.S. Cl. .................................... 384/452; 384/610; 384/611; 384/614; 384/616
[58] Field of Search ................ 384/452, 610, 611, 614, 384/616, 612

[56] References Cited

U.S. PATENT DOCUMENTS

| 931,069 | 8/1909 | Larrabee | 384/610 |
|---|---|---|---|
| 2,068,652 | 1/1937 | Brull | 384/611 |
| 3,005,646 | 10/1961 | Lekas et al. | 384/610 |
| 3,655,226 | 4/1972 | Cowan | 384/610 |

FOREIGN PATENT DOCUMENTS

| 189407 | 1/1906 | Fed. Rep. of Germany . |
|---|---|---|
| 344627 | 12/1920 | Fed. Rep. of Germany . |
| 1019871 | 11/1957 | Fed. Rep. of Germany . |
| 553319 | 5/1923 | France . |
| 543496 | 1/1942 | United Kingdom . |
| 566655 | 1/1945 | United Kingdom . |

OTHER PUBLICATIONS

"Einbau von Miniatur- and Instrumenten Kugellagern", Part 1 from Feinwerktechnik, 1973, No. 3, pp. 93–96.

Primary Examiner—Lenard A. Footland
Attorney, Agent, or Firm—Hill, Van Santen, Steadman & Simpson

[57] ABSTRACT

There is disclosed herein a bearing for highprecision transport spindles used in machines for electrical reproduction technology, machine tools, measuring installations and the like, wherein axial movement due to bearing tolerances are eliminated by the bearing device of this invention. The radial and axial bearing of the spindle are decoupled from one another by means of the bearing device, thereby eliminating the axial dislocation errors.

5 Claims, 1 Drawing Figure

BEARING DEVICE FOR THREADED SPINDLES

BACKGROUND OF THE INVENTION

The present invention relates to a bearing device for threaded spindles by which axial movement of the spindle is eliminated.

Threaded spindles are employed in machine tools, measuring installations and electronic reproduction technology for the movement of supports, and the like, where high precision is required. However, even when the transport spindle is very precisely machined, the support movement periodically exhibits small path errors due to small axial dislocations of the spindle which arise from unavoidable imprecisions in the spindle bearings. This is true even when high precision rolling bearings (i.e., ball bearings, roller bearings, etc.) are used. Furthermore, these path errors are often unacceptable.

In such situations it is common to machine an inside cone in one end face of the spindle. This inside cone is machined with the spindle threads in one machining step. Using this cone, the spindle is seated against a stationary lathe center. An axially-movable, spring-loaded bearing at the end of the spindle, opposite the inside cone, constantly presses the spindle and inside cone against the lathe center.

However, this bearing arrangement may fail when the transport spindle is very long or thick, and thus, heavy. Specifically, excessively high planar pressures occur at the lathe center and lubricating problems result.

As a result of imprecisions in the rolling bearing in which it is seated, the lathe center will also introduce axial movements into the spindle.

Large spindles are mounted in rolling bearings with the aid of step bearings. Then, however, the lathe center point is unavailable as a reference bearing.

It is therefore an object of this invention to provide a bearing device for threaded spindles which eliminates axial dislocations of the spindle and provides for a reference bearing.

These and other objects of this invention will become apparent from the following description and appended claims.

SUMMARY OF THE INVENTION

There is provided herein a bearing device that eliminates axial dislocation of the spindle, even when the spindle is seated in rolling bearings or additional bearings are used.

The bearing device includes bearings for receiving the spindle which have a predominately radial action. Furthermore, the bearing's outer races are displaceable in the direction of the spindle axis. A central inside cone is provided at an end face of the spindle, and a lathe center or bearing point engages the inside cone. The other end of the lathe center or bearing point is provided with a planar surface which engages a ball. The ball presses against a planar end face of a thrust piece which is supported in a rolling bearing. The outer race of this bearing is axially adjustable by a set screw. Springs are provided which engage at least one spindle carrying bearing and are compressed when the set screw is tightened. These springs bias the spindle against the bearing point. A resilient bushing is provided between the bearing point and thrust piece to permit radial movement of the ball and cooperate in eliminating the axial dislocations.

BRIEF DESCRIPTION OF THE DRAWINGS

The FIGURE shows a longitudinal, cross-sectional and partially fragmentary view of the bearing device.

DESCRIPTION OF THE PREFERRED EMBODIMENT

Figure 1:
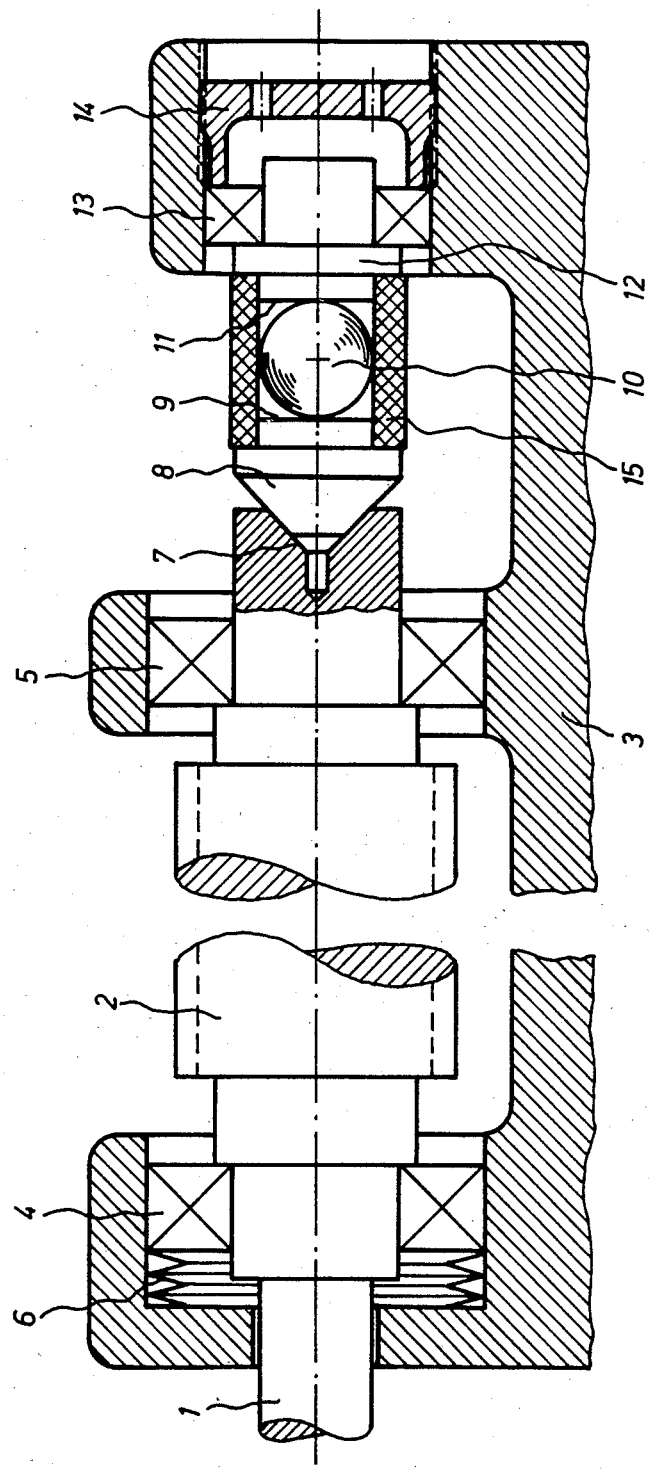

Referring now to the drawings, the threaded spindle 2 is driven by the journal 1 which is carried on the basic machine body 3 by two spaced rolling bearings 4 and 5, which are carried in bearing bores in the machine body. The rolling bearings 4 and 5 are referred to as movable bearings, as their outer races are axially displaceable in the bearings bores. A spring 6, such as a packet of dish or Bellville-type springs, is positioned between the outer race of the bearing 4 and the end face of its bearing bore. A centering cone 7 is machined into the end face of the spindle at the end opposite the threaded spindle 2. A centering point 8 fits into the centering cone 7 and includes a planar running surface 9 at the end face opposite the cone. The running surface 9 engages a ball 10, which at its opposite side engages the planar face 11 of a thrust piece 12 that is positioned in a rolling bearing 13. The rolling bearing 13 is mounted in the machine body 3 and is axially displaceable therein. The running surface 9, ball 10 and planar face 11 are preferably hardened and finish-ground.

The outer race of the rolling bearing 13 is axially movable toward the rolling bearing 4 by a threaded set-screw 14. The spring packet 6 is tensioned by the set-screw 14 acting through the rolling bearing 13, thrust piece 12, ball 10, centering point 8, threaded spindle 2 and rolling bearing 4. A bushing 15 of flexible material is positioned between the centering point 8 and thrust piece 12 and allows the ball 10 slight rolling movement radially relative to the threaded spindle 2.

The overall arrangement is force-locking due to the tensioning of the spring 6 by means of the set-screw 14. The problems described in the background of the invention lead to slight rolling movements of the ball 10 between its running surfaces 9 and 11. The distance between the surfaces 9 and 11 always remains constant and axial errors are no longer introduced into the spindle. No so-called bore friction occurs between the surfaces 9 and 11 and ball 10 because they always turn around the longitudinal axis of the overall arrangement.

The use of this invention is not limited to the bearing of threaded spindles. The invention can be employed wherever the radial and axial bearing of rotatory members must be decoupled from one another in order to avoid mutual disruptions. This problem occurs, for example, when bearing printing cylinders in machines for electro-mechanical engraving of the printing cylinders.

Although the invention has been described with respect to preferred embodiments, it is not to be so limited as changes and modifications can be made which are within the full intended scope of the invention as defined by the appended claims.

We claim as our invention:

1. A bearing device for supporting a threaded spindle, wherein the improvement comprises there being provided:
   a spindle supporting body which includes means defining spindle supporting bearing receiving bores and means defining a centering bearing receiving bore, said bore means being axially aligned;

a plurality of bearings, each mounted in a bore and each axially movable within said bore;

spindle means supported for rotation in spindle supporting bearings, one end face of said spindle means having a central inside cone' therein;

biasing means associated with said body for urging said spindle axially in the direction of the spindle end face having the central inside cone;

centering means which includes a bearing point member having a bearing point for engagement with said spindle inside cone and a planar surface axially opposite said bearing point;

a ball assembly having a ball and a resilient outer bushing, said assembly engaging the planar surface of said bearing point member and the centering bearing, said ball assembly constructed to permit rolling movement of said ball in a direction transvere to said spindle;

adjustment means for urging said centering bearing toward said ball assembly, said ball assembly toward said bearing point, said bearing point into said cone and said spindle against said biasing means;

so as to permit accurate axial adjustment of said support device and transverse rolling of said ball in said ball assembly.

2. A device as in claim 1, wherein there is provided thrust plate means between said centering bearing and said ball, said plate constructed to rotate with said bearing and to engage said ball assembly.

3. A device as in claim 2, wherein said ball assembly includes a pair of spaced transversely oriented plates, each having an inner running surface which engages said ball, one engaging said thrust plate means and the other engaging the planar surface of said bearing point member, said resilient bushing being cylindrical in shape and oriented generally parallel to the spindle and surroundingly engaging said plates and ball so as to retain the ball between said plates.

4. A device as in claim 3, wherein said bushing is constructed to flex in the transverse direction.

5. A device as in claim 1, wherein said spring biasing means is a compression spring which engages a spindle supporting bearing and urges the bearing against the spindle in the direction of the centering cone.

* * * * *